Feb. 4, 1969
R. C. WOOD
3,425,174
GROUND ANCHOR
Filed May 12, 1967
Sheet 1 of 2
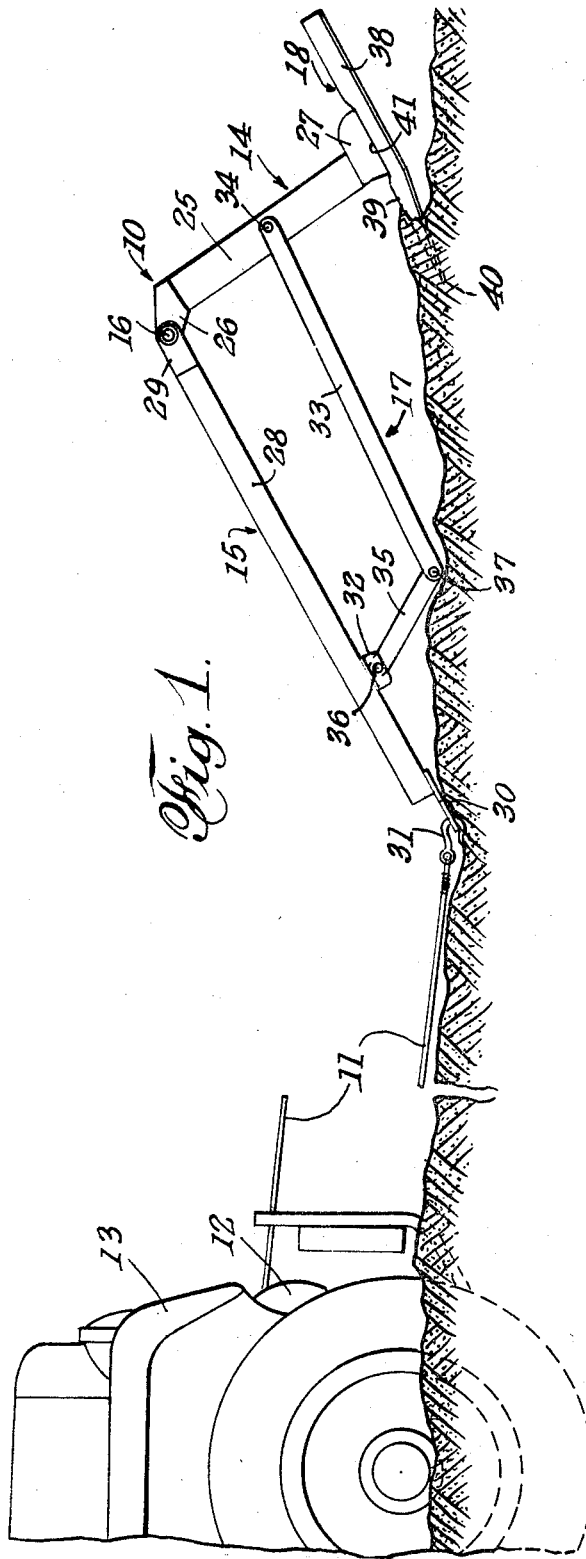
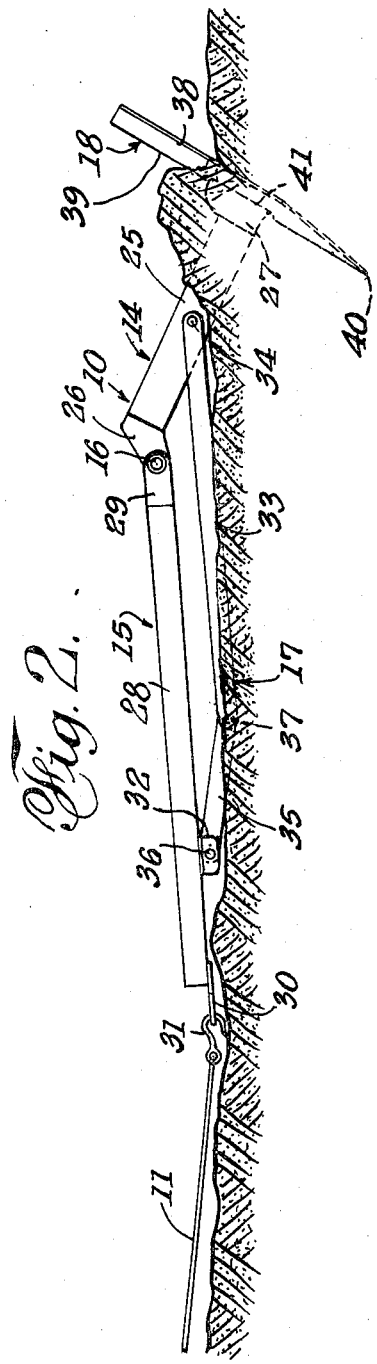
INVENTOR.
ROSS C. WOOD
BY C. G. Stratton
ATTORNEY

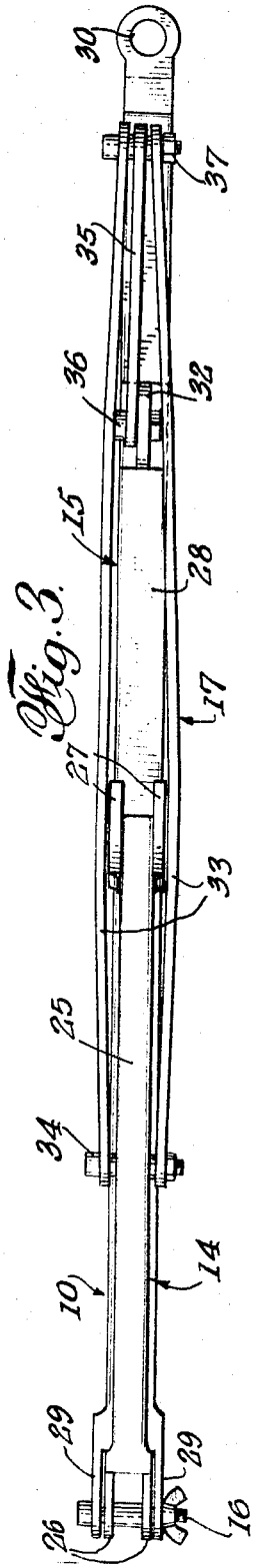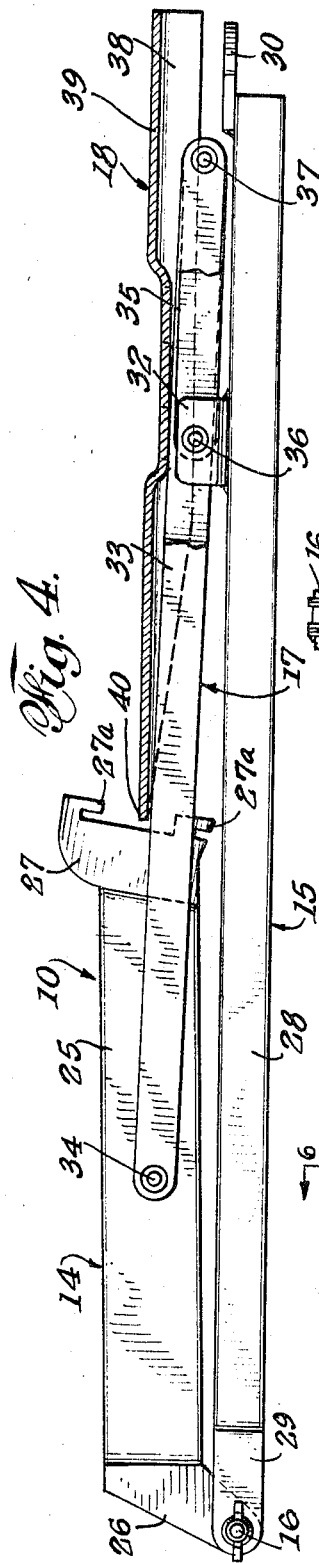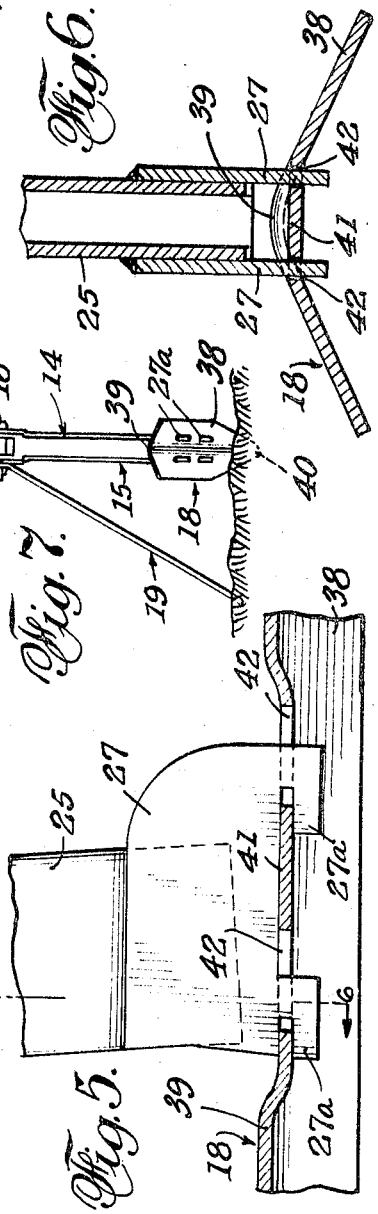

United States Patent Office 3,425,174
Patented Feb. 4, 1969

3,425,174
GROUND ANCHOR
Ross C. Wood, 633 California St.,
El Segundo, Calif. 90245
Filed May 12, 1967, Ser. No. 638,082
U.S. Cl. 52—162         7 Claims
Int. Cl. E02d *5/80;* B60s *9/00*

ABSTRACT OF THE DISCLOSURE

An articulated and portable anchor that, under forward pull, buries itself in the ground. When the pull is exerted by a winch-wound cable on a vehicle that is bogged down in soft ground, the anchor, when so buried, enables the vehicle, by means of the power of said winch, to pull itself free. The anchor is foldable to flat, stowable condition.

BACKGROUND OF THE INVENTION

In the past, vehicles have been drawn from places in which they have become bogged down or buried by means of the vehicle power applied to a winch and a cable. However, such use of the winch and cable required means, such as a tree, large rock, pole or other fixed and strong anchor means, to which the cable could be attached, and there are many wild and remote areas, as swamps, deserts and sandy places generally, that do not provide such anchors. This invention has for an object to provide a portable anchor that, under pull on a winch-bound cable provided on a vehicle, first firmly embeds itself in the ground to become anchored therein, and then serves to keep tension on the cable as the winch winds the cable up, thereby shortening its effective length and pulling the vehicle from the ground in which it has become bogged or buried.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, one embodiment of the present invention, which is given by way of illustration or example only.

SUMMARY OF THE INVENTION

The present anchor 10 is connected to a cable 11 of a winch 12 applied to or forming a component part of a vehicle 13. Said cable, winch and vehicle are merely exemplary components that when operatively connected to the anchor 10 in an area where the same can become embedded, are used for moving said vehicle, under its own power, from a bogged-down or buried condition.

The anchor 10 comprises, generally, a cantilever post 14, a tongue 15 pivotally connected at 16 by one end to an end of said post, tension linkage 17 connecting an intermediate portion of the post 14 with the tongue 15 adjacent its end remote from the pivot 16, and a blade 18 separably connected to the end of the post 14 that is opposite to the end having the pivot 16. Optionally, a brace 19 connected to said pivot 16 may be provided to support the anchor in upright operative position before the blade thereof has become at least partly buried in the ground.

In the drawings, like reference characters designate similar parts in the several views.

BRIEF DESCRIPTION OF DRAWINGS

FIG. 1 is a side elevational view, partly broken, showing the present anchor connected to the winch of a bogged-down vehicle preparatory to a vehicle-freeing operation.

FIG. 2 is a side elevational view of said anchor as embedded or buried in the ground due to the vehicle-freeing pull by the winch.

FIG. 3 is an enlarged top view of said anchor in folded position.

FIG. 4 is a side view thereof partly broken and partly in section.

FIG. 5 is a further enlarged side view, partly in section, showing a detail of the construction.

FIG. 6 is a cross-sectional view as taken on the line 6—6 of FIG. 5.

FIG. 7 is an end view of said anchor in the position of FIG. 1 and shown provided with a stabilizing brace.

DESCRIPTION OF THE PREFERRED EMBODIMENT

The cantilever post 14 is shown as a length of tubing 25 of preferably rectangular cross-section. One end of said tubing is provided with a pair of ears 26 which extend laterally, as best seen in FIG. 4. The opposite end of said tubing, in the same planes as the ears 26, is provided with connection plates 27, the ends of which are provided with tongues 27a that are arranged in forwardly directed pairs.

The tongue 15 is preferably formed of a length of square tubing 28 approximately twice the length of the tubing 25. One end of this tubing is provided with a pair of ears 29 between which the lateral portions of the ears 26 extend, the mentioned pivot 16, shown as a bolt and wing nut, connecting said two pairs of ears 26 and 29 so the two members 14 and 15 may be moved relatively on said pivot between a folded position alongside of each other, as in FIG. 4, a substantially fully extended position, as in FIG. 2, and any intermediate angular position, as exemplified in FIG. 1. The opposite end of the tubing 28 is provided with an eye 30, or the like, for connection as with a hook 31 on the end of the cable 11. An ear 32 is provided on the face of the tubing 28 on the side thereof toward the post 25, and located between the eye 30 and the plates 27 when the post 14 and the tongue 15 are folded, as in FIG. 4.

The tension linkage 17 is shown as two longer links 33, each connected at one end to the sides of tube 25 by a pivot 34, a shorter link 35 connected at one end to the ear 32 by a pivot 36 and at its other end to the opposite ends of the links 33 by a pivot 37. FIGS. 3 and 4 show how the above-described links fold with the link 35 between the links 33 when the post 14 and tongue 15 are folded, as described. It will be noted that the sum of the lengths of the pair of links 33 and the link 35 is less than the sum of the distance between the pivot 16 and the pivot points 34 and 36.

The blade 18 is shown as a plate 38 with a longitudinal obtuse bend 39. The main portion of said plate 38 is rectangular, the forward portion being brought to a sharp point 40. At its midportion, said obtusely bent plate is provided with a flat area 41 and two sets of aligned slots 42, to match the tongues 27a on the post 14, are provided to receive said tongues in hooking engagement and connection, as shown in FIG. 5. Said tongues 27a are directed so this engagement is maintained under forward pull on the post 14 but can easily be withdrawn from the slots 42 so the blade may be placed in flat-nested and space-saving position, as in FIG. 4, when the anchor is folded.

When the anchor is placed in operative position with the blade 18 attached to the post 14 and the tongue 15 unfolded, the angle of the blade, in relation to the ground, is quite small so the point 40 of the blade can easily be penetrated into the ground more forwardly than downwardly. The eye end of the tongue may rest upon or be somewhat above the ground. Thus, due to the forwardly inclined position of said post 14, the included angle between it and the tongue 15 will be about 90° and, usually somewhat more obtuse, as shown in FIG. 1. Now, when the winch begins its pull on the cable 11, this angle begins to become more obtuse and in so doing, the upper end of the post 14 is pulled forwardly, resulting in a steepening of the angle of the blade. In the process, the anchor is pulled forwardly from its initial disposition, the point of the blade being drawn not only forwardly but downwardly into the ground. When the linkage 17 has become straightened, as in FIG. 2, the anchor in effect has the shape of a T with the straightened members 14 and 15 constituting an anchor post and the blade 18 constituting the anchor arms, of which at least half, and frequently more, is embedded in the ground.

When the blade imposes resistance to further movement through the ground, the same provides an anchor point relative to which the vehicle, under its own power and the power of the winch, is drawn forwardly from its bogged-down position.

It is necessary only to push back on the end of the tongue 15 to effect an easy removal of the anchor from the ground.

Since the anchor and the vehicle frequently may be separated by a hundred or more feet, and the ground may be of such hardness as to preclude a stabilizing preliminary penetration of the blade point 40, resort may be had to means such as the brace 19 to prevent the anchor from tipping sidewise before a firm ground penetration is effected.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. A ground anchor comprising:
   (a) a blade having a ground-penetrating point,
   (b) a cantilever post fixedly connected to and extending from the approximate center of said blade,
   (c) an elongated tongue pivotally connected to the end of said post that is remote from the blade and extending in the same direction as the point on the blade, and
   (d) pivoted tension linkage connecting a midportion of the post and a portion of said tongue adjacent to said remote end thereof,
   (e) the angle between the post and the tongue increasing and the linkage becoming straightened when the point of the blade is entered in the ground at an acute angle and the end of the tongue is pulled, the blade point thereby penetrating further into the ground and the angle thereof becoming more obtuse.

2. A ground anchor according to claim 1:
   (a) the end of the post opposite the pivot connecting it to the tongue being provided with downwardly and forwardly directed hooks,
   (b) the blade having slots to receive said hooks for separable connection of the post and the blade, and
   (c) the post and tongue being foldable on their connecting pivot, one on the other, upon separation of the blade from the post.

3. A ground anchor according to claim 2 in which the tension linkage comprises a shorter link pivotally connected to the tongue and a pair of longer links, one connected to each side of the post at the mentioned midportion, and the end of the shorter link being disposed between and pivotally connected to the ends of the longer links.

4. A ground anchor according to claim 1 in which the included angle between the end of the blade having the point and the post is less than 90°.

5. A ground anchor according to claim 3 in which the sum of the length of the shorter and longer tension links is less than the sum of the distances between the post and tongue and said midportion of the post, and said pivot and said adjacent portion of the tongue.

6. A ground anchor according to claim 2 in which the blade is bent at an obtuse angle along the length thereof from its point to the opposite end of the blade.

7. A ground anchor according to claim 6 in which the angle of the bend is on the side away from the post, a flat in the blade being provided where the end of the post bears thereagainst and wherein the mentioned slots are provided.

References Cited

UNITED STATES PATENTS 1,316,323  9/1919  Poole _____ 52—155

FOREIGN PATENTS 322,075  10/1934  Italy.
334,525  1/1959  Switzerland.

FRANK L. ABBOTT, *Primary Examiner.*

PRICE C. FAW, JR., *Assistant Examiner.*

U.S. Cl. X.R.

52—166; 242—95.